June 12, 1951 H. M. DUDEK 2,556,171
INJECTION VALVE ASSEMBLY
Filed Nov. 13, 1945 5 Sheets-Sheet 1
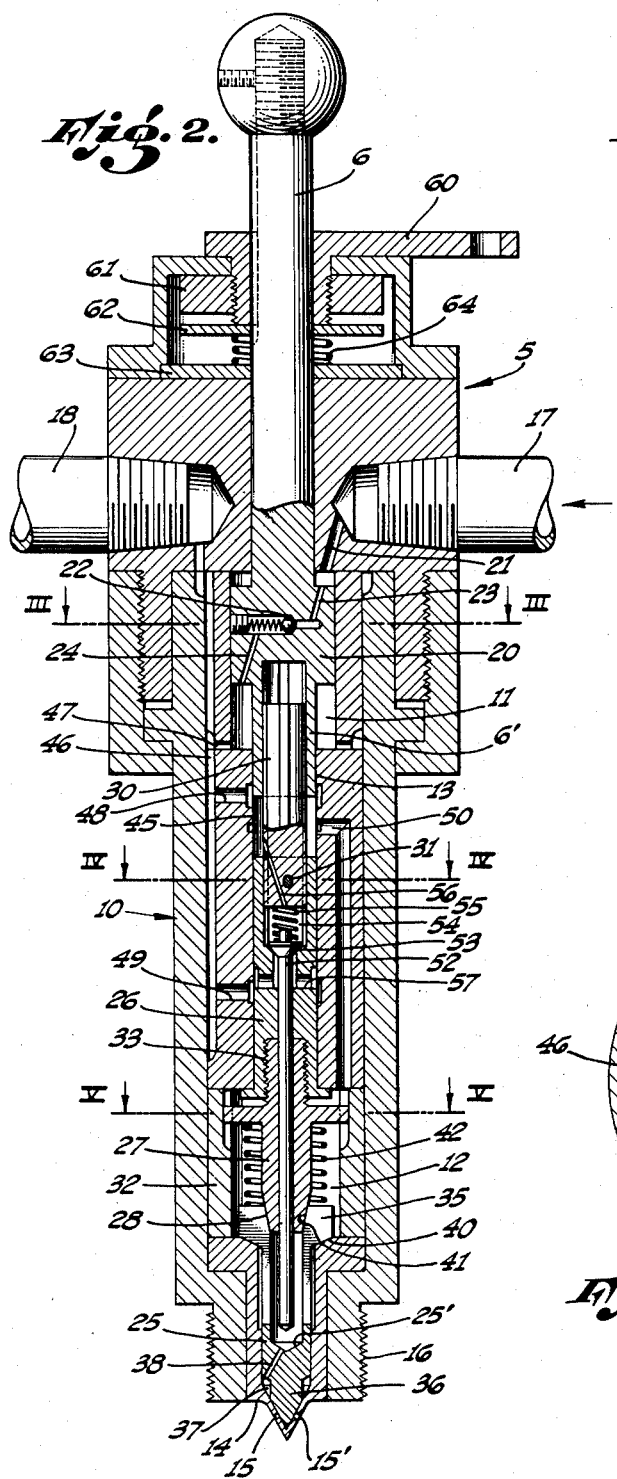
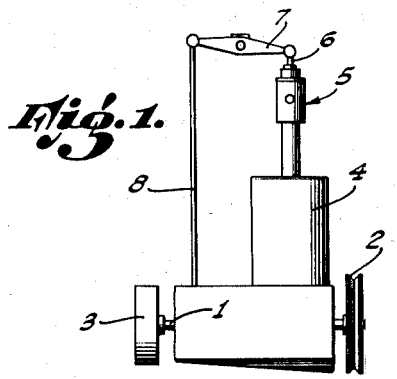
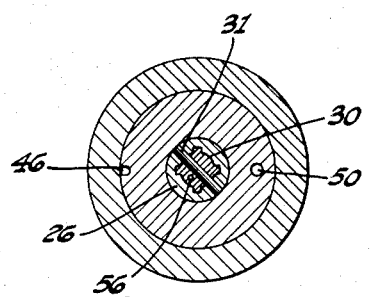
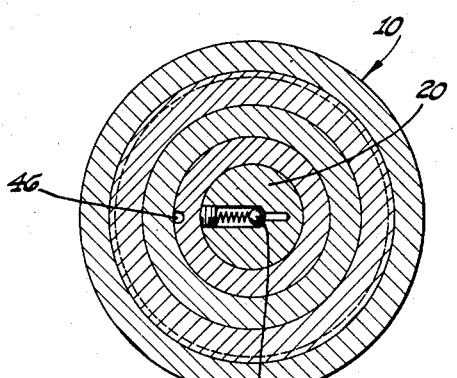
INVENTOR.
HAROLD M. DUDEK,
BY
ATTORNEY.

June 12, 1951 — H. M. DUDEK — 2,556,171

INJECTION VALVE ASSEMBLY

Filed Nov. 13, 1945 — 5 Sheets-Sheet 2

INVENTOR.
HAROLD M. DUDEK,
BY
ATTORNEY.

June 12, 1951 H. M. DUDEK 2,556,171
INJECTION VALVE ASSEMBLY
Filed Nov. 13, 1945 5 Sheets-Sheet 3

INVENTOR.
HAROLD M. DUDEK,
BY
ATTORNEY.

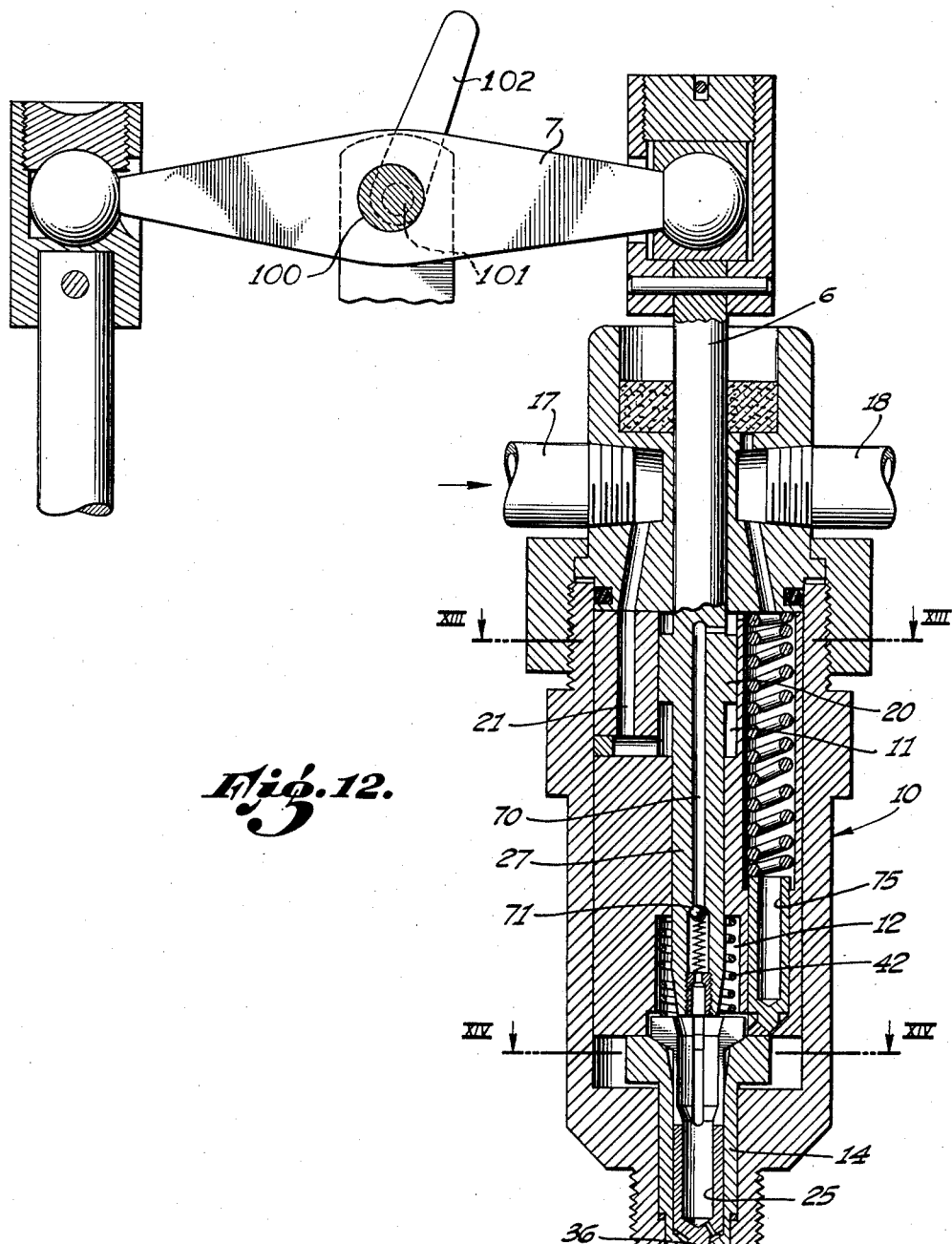

June 12, 1951     H. M. DUDEK     2,556,171
INJECTION VALVE ASSEMBLY

Filed Nov. 13, 1945     5 Sheets-Sheet 5

INVENTOR.
HAROLD M. DUDEK,
BY
ATTORNEY.

Patented June 12, 1951

2,556,171

UNITED STATES PATENT OFFICE 2,556,171

INJECTION VALVE ASSEMBLY

Harold M. Dudek, Altadena, Calif.

Application November 13, 1945, Serial No. 628,327

26 Claims. (Cl. 103—41)

1

This invention pertains to an injection valve adapted for use with engines of the Diesel type or wherever it is desired to periodically inject predetermined quantities of liquid into a chamber, conduit or other zone. The invention is particularly directed to an injection valve of compact structure and quiet operation, adapted to be driven directly from the crank shaft or cam shaft of an engine. It is also directed to an injector valve employing novel means of translating a reciprocating action of an actuating stem into an axial movement of an injector valve. Furthermore, the invention contemplates an injector valve arranged to permit injection of fuel oil prior to the completion of a compression stroke, utilizing the fluid linkage to energize the valve mechanism and including means for throttling an engine.

The injection of fuel oil into the compression chamber of an engine in a foolproof, accurate manner has presented numerous problems heretofore. The present invention is directed to an injection valve assembly characterized by freedom from gears, rotary valves, complex timing mechanisms, needle-type valves and other structural details which ordinarily clog or stick, are difficult to place in operative condition, and are difficult to maintain in continuous operation.

It is an object of the present invention to disclose and provide a simple and efficient injector valve.

A further object is to provide an injector valve including simple means for opening and closing the injection ports.

A still further object is to provide an injection valve operated by means of a reciprocable stem which may be driven directly from the crank shaft or cam shaft, such stem moving axially toward and away from the injection valve and imparting a regulated, oppositely directed motion to the valve element proper.

In addition, it is an object of the present invention to provide a stem-actuated injection valve in which the valve element is driven by means of a fluid coupling.

Moreover, an object of the invention is to provide an injection valve including means for throttling the valve, such means comprising an adjustment of the valve actuating stem.

It is also an object of the invention to provide an injection valve assembly whereby high pressures may be imparted to the liquid prior to and during injection.

A still further object is to provide simple means for controllably regulating the initiation and length of the injection cycle.

In general, it is an object of the invention to provide a simple, compact, injection valve structure which is quiet in its operation and relatively free from maladjustments and operating difficulties.

These and other objects of the invention will become apparent to those skilled in the art from the following description of an exemplary form of my invention, in which:

Fig. 1 is a schematic side view of a one-cylinder engine provided with the injection valve of this invention.

Fig. 2 is a longitudinal section through an injection valve assembly embodying the invention.

Fig. 3 is a transverse section taken along the plane III—III of Fig. 2.

Fig. 4 is a transverse section taken along the plane IV—IV of Fig. 2.

Fig. 12 is a longitudinal section taken through a simplified form of injection valve.

Figure 7:
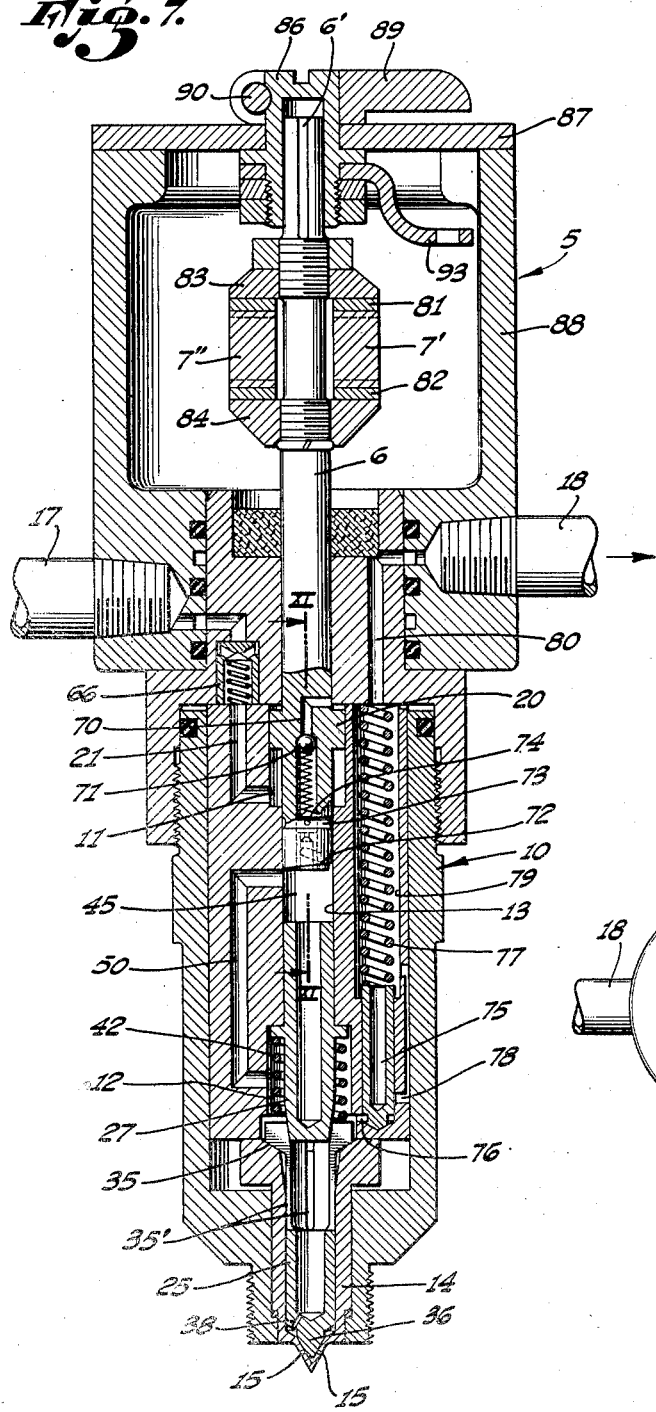
Fig. 7 is a longitudinal section through a modified form of injection valve.
Figure 5:
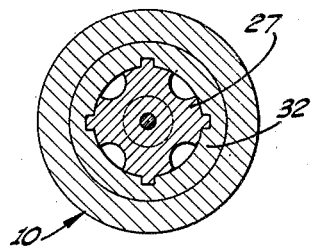
Fig. 5 is a transverse section taken along the plane V—V of Fig. 2.

The diagrammatic representation of a one-cylinder engine appearing in Fig. 1 includes a crank shaft 1 carrying a starting fly wheel 2 at one end and a power take-off fly wheel 3 at the other end. The crank shaft is driven by means of a piston operating within the cylinder 4. An injection valve assembly, generally indicated at 5, extends into the top of the combustion chamber. An actuating stem 6 extends from the injection valve, such stem being operated by means of a rocker lever 7 and a vertically reciprocable push rod 8 driven by an eccentric carried upon the crank shaft 1. This diagrammatic representation does not include an inlet for air, exhausts, oil circulating systems and other details.

The injection valve of the present invention may take a variety of forms. One form is illustrated in Figs. 2 to 6 inclusive. As shown in the longitudinal section (Fig. 2), the injection valve may comprise a housing, generally indicated at 10. The housing may be said to include an upper chamber 11 and a lower chamber 12, said chambers being connected by an axial bore 13. The bottom of the housing 10 may include an injection head 14 having a conical portion provided with the nozzles or ports 15 and 15'. The lower portion of the housing 10 may be provided with external threads 16 by means of which the injection valve assembly may be threadedly connected into a suitable port in the head of the cylinder containing the combustion or precombustion chamber.

Reciprocably mounted within the bore 13 is a cylindrical stem 6. Suitable means are provided for connecting the stem 6 to the rocker arm 7 or to any other mechanism adapted to impart timed reciprocating movement to the stem 6, such movement being timed to the firing cycle or power cycle of the piston within the cylinder 4.

Means are provided for supplying liquid fuel to the injection valve assembly. Such means may comprise the inlet port 17 adapted to be connected by suitable conduit means to a source of liquid fuel under any suitable head, and may include a suitable transfer pump. The conduit connected to the inlet port 17 preferably includes a check valve preventing return flow or outward flow from the port 17. The opposite side of the injection valve housing may also be provided with an outlet port 18 connected by suitable conduit means (not shown) through a pressure relief valve to the sump or supply of fuel oil.

The fuel supplied through the inlet port 17 may lead to one side of a piston 20 carried by the stem 6 and reciprocable within the upper chamber 11. A conduit 21 is shown communicating the inlet port 17 with the space above the piston 20 in the illustrated example.

The piston 20, together with its correlated parts, constitutes a stem-actuated means for placing the incoming fuel oil under pressure. The correlated parts may comprise check valve means 22 positioned within the piston 20 and in series with conduits 23 and 24 whereby oil from above the piston 20 may be forced to a position beneath the piston 20, the check valve 22 preventing return of such oil or other liquid.

It may be noted in passing that the diameter of the stem 6 below the piston 20 is greater than that above the piston 20 so that the chamber beneath the piston is of smaller cross-sectional area than the chamber above the piston. This enlarged portion of the stem 6 (shown at 6') extends into the bore beneath the chamber 11.

The bore beneath the chamber 11 carries means for actuating a valve element 25 slidably positioned within the injector head 14. The valve actuating means comprise a floater 26 carrying a lower, hardened wedging element 27 provided with a tapered or conical lower portion 28. This valve actuating mechanism is preferably connected to a spline 30 slidably extending into the lower portion 6' of the stem. The spline 30 may be pinned to the floater 26 as by means of a pin 31 (see Fig. 4). The wedge element 27 may be splined to a stationary housing portion 32, a threaded connection 33 existing between the floater 26 and wedge 27 so that the floater 26 may be rotated with respect to the wedge 27 and moved axially with relation to the wedge (see Fig. 5).

From the construction described, it will be evident that in the event the stem 6 is rotated, such rotation will be translated through the spline 30 to the floater 26 while the wedge 27 will not be rotated by reason of its interlocking relationship with the wall element 32.

The valve element 25 preferably consists of a cylindrical body portion provided with an outwardly extending flange 35 at its upper end. The upper flanged portion of the valve element is furcated whereas the lower portion of the valve element is solid and carries a head or base 36 provided with a conical surface normally seated upon and closing the atomizing ports 15 and 15'. The head 36 may be of smaller diameter than the body portion so as to form a chamber 37 surrounding the head 36, such chamber 37 communicating with the interior of the hollow valve element 25 by means of a conduit 38.

The lower surfaces of the flange 35 are conical or inclined to a plane transverse to the longitudinal axis of the valve element 25, such conical or inclined surfaces being indicated at 40. Such inclined or conical surfaces rest upon cooperating inclined surfaces of the atomizing head 14. The inner surfaces of the hollow, cylindrical valve element 25, particularly in the area of the flange 35, are conical or tapered as indicated at 41, the taper preferably corresponding to the taper 28 of the wedge 27. The wedge 27 may be provided with a shoulder so as to permit a spring 42 to normally urge the wedge upwardly and to press against the top of the flange 35 of the valve element 25 so as to seat the head 36 upon the ports 15.

It will be noted that the upper end of the floater 26 is spaced from the lower end of the enlarged stem portion 6' so as to form an intermediate, fluid coupling chamber 45. This fluid coupling chamber 45 is in communication with a distribution channel 46 formed in the walls of the housing, said channel being in communication with the outlet port 18, the primary pressure chamber 11 (through a port 47), the fluid coupling chamber 45 (through channel 48) and with a relief port 49. The intermediate or fluid coupling chamber 45 is in communication with the lower chamber 12 by means of a conduit 50. Fuel oil supplied to the lower chamber 12 by means of the conduit 50 may pass into the hollow valve element 25 through the slots which separate the furcated portions of the upper end of such valve element and through channel 38 into the annular chamber 37.

Extending axially through the floater 26 is a bore containing a slidable relief valve stem 52 carrying a valve 53 which is normally seated upon a suitable seat formed in the bottom of a chamber 54 located in the upper end of the floater 26. The valve 53 is normally seated by reason of a compression spring 55 bearing against the valve. The chamber 54 is in communication with the chamber 45 by means of a channel 56 formed in the lower portion of the spline 30.

The axial bore in which the stem 52 is slidably mounted is enlarged immediately beneath the valve 53 and communicates with cross channels 57 operatively related to the relief port 49 formed in the walls of the housing. The stem 52 is preferably of such length that it will make contact with the bottom 25' of the valve element 25 when such valve element has been raised a desired distance during an injection operation.

In the operation of this device, fuel oil is supplied through the inlet port 17. Such fuel oil is admitted to the upper part of chamber 11 and when the stem 6 is reciprocated, oil from the upper portion of such chamber is passed to below the piston 20 through conduits 23 and 24 and check valve 22. All of the passageways and chambers described previously are filled with oil.

Fig. 2 illustrates the piston 20 at the top of the stroke. As such piston 20 descends, oil beneath the piston in the chamber 11 is compressed. The pressure to which the oil is raised is regulated in major part by the setting of the pressure relief valve in the discharge line connected to discharge outlet 18. The compressed oil is forced through port 47, distribution channel 46 and port 48 into the fluid coupling chamber 45 and from such chamber by conduit 50 into the lower chamber 12.

During this preliminary movement of the stem 6 and piston 20, the valve actuating mechanism including the floater 26 and wedge 27 does not move downwardly by reason of the splined connection between the spline 30 and portion 6' of the stem.

A fluid linkage is provided between the stem 6 and the valve actuating mechanism, such linkage becoming effective at a predetermined point in the travel of the stem 6 and when a desired pressure has been built up in the lower chamber 12. Moreover, the fluid linkage does not become operative until the lower chamber 12 has been isolated.

It will be noted that as the stem 6 descends, the oil beneath the piston 20 is first subjected to increasing pressure and supplied at such higher pressure to the fluid coupling chamber 45. Thereafter the lower portion of the stem 6 closes the port 48 and continues downwardly so as to impart an even greater pressure to the oil in chamber 45, conduit 50 and lower chamber 12. After a desired high pressure has been thus imposed upon the oil, the lower portion of the stem 6 closes the port 50 and isolates the highly compressed charge of oil within the chamber 12. Thereafter the oil remaining in the intermediate chamber 45 acts as a fluid linkage between the stem and the valve actuating mechanism, driving the floater 26 and wedge 27 downwardly into the furcated upper end of the valve member 25.

The taper 41 of the wedge 27 expands the furcated and flanged upper end 35 of the valve member 25 and the expansive downward force of such wedge is translated into an opposing axial upward movement of the head 36 of the valve element 25. The upward movement of the head 36 opens the ports 15 and permits the highly compressed, high pressure oil contained in chamber 12 and annular chamber 37 to be forcibly ejected through the ports 15.

The downward movement of the valve actuating mechanism coupled with the upward movement of the head 36 causes contact to be established between the bottom 25' of the valve member and the lower end of the stem 52. The fluid linkage is broken and discontinued automatically when the relief valve stem 52 is raised since the lifting of the valve 53 from its seat releases the oil constituting the fluid linkage in chamber 45 through channel 56, valve 53, port 57, and relief port 49 into distribution channel 46 and outlet port 18.

The discharge or release of the fluid linkage oil closes the valve 25 since it permits the valve actuating mechanism to move upwardly even though the stem 6 is still traveling downwardly. The closing action of the valve element 25 is primarily due to the resiliency of the upper furcated portion of the valve but it is assisted somewhat by the action of the spring 42.

It will be noted that the arrangement hereinabove described is characterized by a straight line reciprocating action of the stem and its piston and the axial alignment of the stem, the valve actuating mechanism and the valve member itself. The injector is quiet in its operation by reason of the fluid linkage between the stem and the valve actuating assembly. It is further characterized by the fact that the valve may be caused to open any predetermined amount and close before the completion of the downward stroke of the stem 6. By properly correlating the diameters of the stem, piston, spline, etc., the liquid to be injected may be raised to any desired pressure before injection.

Figure 6:
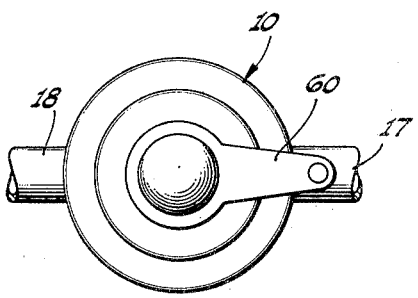
Fig. 6 is a reduced plan view.
Figure 8:
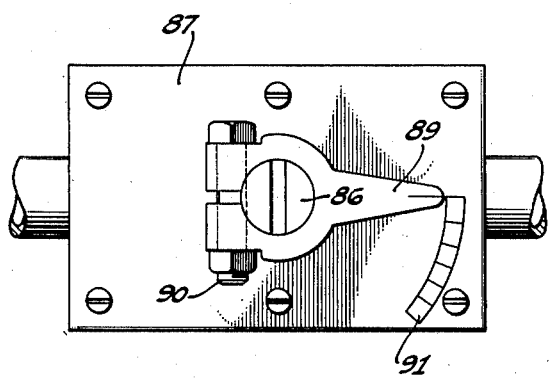
Fig. 8 is a plan view of the device shown in Fig. 7.
Figure 9:
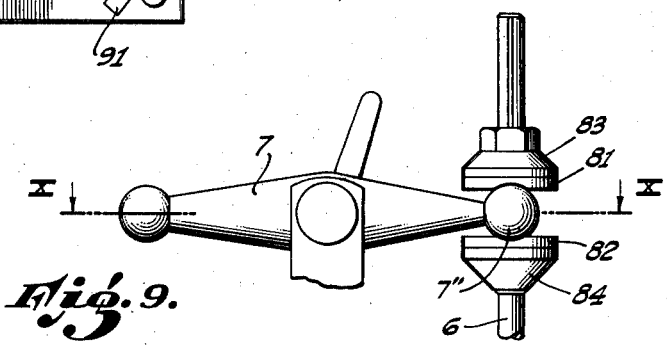
Fig. 9 is a side elevation of the rocker arm assembly of the device shown in Fig. 7.
Figure 10:
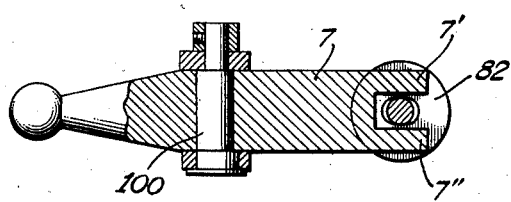
Fig. 10 is a horizontal section taken along the plane X—X of Fig. 9.

Means have also been provided for throttling the injection valve in a very simple manner. It will be observed that in the event the stem 6 is partially rotated, partial rotation is imparted to the floater 26. Since this floater is threadedly connected at 33 to the wedge 27 and since such wedge is limited in its upward movement, the length of relief stem 52 extending below the wedge may be varied. By thereby changing the length of the relief stem 52, the length of the injection period may be varied and this in turn modifies and varies the amount of fuel oil injected through the nozzles 15 and simultaneously advances the initiation of the injection of the fuel. A simple throttle means is shown in Figs. 2 and 6 and may comprise an arm 60 keyed to the stem 6, the arm being held from axial movement with the reciprocation of the stem by means of a retaining nut 61. Suitable scraper discs 62 and 63 with an intervening spring 64 may be provided to prevent oil from exuding along the stem 6. The outer end of arm 60 may be provided with a suitable adjustment handle or pointer cooperating with a graduated scale (not shown) so that the valve may be either manually or automatically adjusted for any predetermined or desired speed of the engine.

The modified from of device illustrated in Figs. 7 to 11 includes means for storing up a larger quantity of fuel oil at a desired high pressure in the lower chamber of the injection valve so that there is no sharp drop in the pressure of the oil being injected during the injection period. In order to facilitate understanding, the numbers applied to the device shown in this modification will be identical to the numbers applied in the original form whenever the individual parts are of like character or function.

As shown in Fig. 7 the inlet 17 communicates with the upper chamber 11 by means of a conduit 21, said conduit including a check valve 66. In the modification here described the incoming fuel is supplied to a point below the piston 20 carried by the stem 6 and during the downward movement of the stem, such oil is subjected to pressure and pumped into the space above the piston 20 through a side channel 67 including a check valve 68 and a channel 69 (see Fig. 11). From the space above the piston 20 the liquid fuel is pumped through an axial passageway 70 formed in the stem 6 to the intermediate or fluid coupling chamber 45, a suitable check valve 71 being positioned within the channel 70. A fluid passageway or conduit 59 extends from this fluid coupling chamber 45 to the lower chamber 12 of the device and such lower chamber includes an injection head 14, the valve element 25 having the upper furcated and outwardly flanged portions 35 (the longitudinally directed slots which form the furcations being indicated at 35').

A wedge-shaped actuating member 27 is also positioned in the lower chamber 12, this wedge-shaped actuating member having an upward extension slidable within the bore 13. A spring 42 bears against the top of the valve element 25 in a manner similar to that previously described.

It will be noted, however, that in the modification now under discussion a splined connection between the stem 6 and the valve actuating member 27 does not exist. The lower end of the stem 6 is provided on its surface with a helical groove 72. It may be said that the end of the stem 6 instead of presenting an edge lying in a plane transverse to the axis of the stem 6, presents an inclined edge 72, such inclined edge forming a margin of the helical groove, the groove ordinarily only partially encircling the circumference of the stem 6.

The lower portion of the stem 6 beneath the piston 20 is also provided with a circumferential groove 73, such groove being in communication with the axial channel 70 (at a point beneath the check valve 71) by means of a port or ports 74.

The lower chamber 12 is also in communication with a surge chamber containing a piston 75. The channel 76 communicates the chamber 12 with the bottom end of the piston 75. The piston 75 is normally held in its down position (illustrated in Fig. 6) by means of a heavy spring 77. A relief channel 78 may connect the lower or intermediate portion of the piston chamber with the chamber 79 in which the spring 77 is located and the chamber 79 may in turn be connected by means of a relief channel 80 with the outlet conduit or port 18.

Means for reciprocating the stem 6 in timed relation to the operation of the engine to which the injector valve is attached have been shown in greater detail in Figs. 7 to 10. It will be noted that the rocker arm 7 is provided with furcated end portions 7' and 7" adapted to straddle stem 6. These rounded furcated end portions are held between compressible washers 81 and 82 held against the ends of the rocker arm by means of suitable locking rings 83 and 84 respectively threaded upon appropriate portions of the stem 6. The upper end of the stem 6 is splined as indicated at 6' so as to slidably move within a fitting 86 rotatably mounted within a bore formed in a cover plate 87 of an upper housing portion 88. The end of the fitting 86 carries an index arm 89 clamped as by means of a clamping stud 90. The cover 87 may be provided with a scale or index 91 so as to permit the arm or pointer 89 to cooperate therewith.

Rotation of the stem 6 may be attained, therefore, by moving the arm 89, rotation being transmitted to the stem by means of the splined portion 6'. Rotation of the stem 6 does not affect the cooperative engagement of the rocker arm 7 with the stem since the washers 81 and 82 may remain stationary while the retaining nuts 83 and 84 rotate with the stem. A suitable governing device may be attached to the fitting 86 (and thereby to the stem 6) as by means of the link 93.

In operation, liquid fuel is supplied through the port or conduit 17. On the down stroke of the stem 6, fuel supplied to chamber 11 is forced through the bypass channel 67 and check valve 68 into the chamber above the piston 20, the check valve 66 preventing return of liquid fuel to the supply conduit 17. On the up stroke the liquid fuel contained above the piston 20 is supplied through the axial passage 70 and check valve 71 to the intermediate fluid coupling chamber 45 and by channel 50 to the lower chamber 12.

The injection valve is operated during the down stroke of the stem 6 in the following manner:

As the stem 6 moves downwardly it first reaches a position where the port leading into channel 50 is closed by the lower edge of the stem 6, thereby isolating the lower chamber 12. Liquid fuel trapped within the fluid coupling chamber 45 then acts as an hydraulic linkage so that continued downward movement of the stem 6 causes downward movement of the valve actuating member 27. During the preceding strokes, a relatively large body of liquid fuel at high pressure has been accumulated in chamber 12 and some excess has been accumulated in the surge chamber containing the piston 75. As the valve actuating member 27 moves downwardly it radially expands the furcated, outwardly flanged portions 35 of the valve element 25, causing the valve head 36 to move upwardly, thereby opening the ports 15 and permitting atomization and injection of liquid fuel through the ports into the combustion or precombustion chamber of the engine. It will be noted that as the valve actuating member 27 descends, some additional pressure is built up within the lower chamber 12. As injection proceeds, the heavy spring 77 forces the piston 75 downwardly, thereby supplying additional liquid fuel to the chamber 12 through the channel 76; injection is discontinued automatically when the annular groove 73 formed near the lower end of stem 6 communicates with channel 50. When the groove 73 communicates with the port leading to channel 50, the high pressure within the fluid coupling chamber 45 is relieved and equalized with the pressure in chamber 12 through port 74 and channel 50, permitting the valve actuating member 27 to move upwardly under the influence of the spring 42, the valve 25 thereupon seating upon the ports 15 and 15'.

It will be noted that in the arrangement described in connection with Fig. 7, partial rotation of the stem 6 simultaneously increases the amount of fuel and advances the initiation of injection of the fuel. The fluid coupling 45 does not come into play until channel 50 is closed. The helically arranged edge 72 (or a transverse portion of the lower edge of stem 6) is used in shutting off the channel 50. Partial rotation of the stem 6 by means of the throttle arm 89 will therefore cause the lower chamber 12 to be isolated at different points in the travel of the stem 6. This thereby advances or retards the initiation of injection of the fuel since it also advances or retards the instant at which the valve 25 opens. Since the groove 73 is transverse and edge 72 is inclined thereto, the length of time during which injection takes place varies with the length between edge 72 and groove 73 at various points along the circumference of the stem 6.

Figure 13:
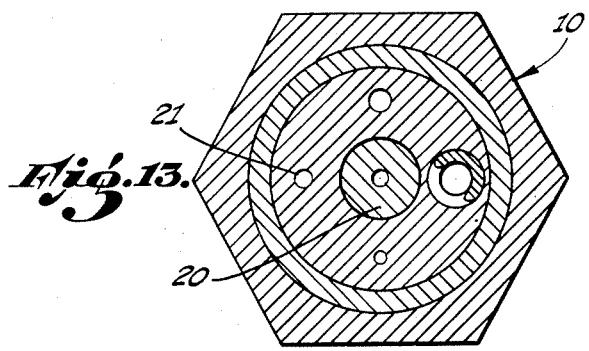
Figs. 13 and 14 are transverse sections taken along the planes XIII—XIII and XIV—XIV respectively of Fig. 12.
Figure 14:
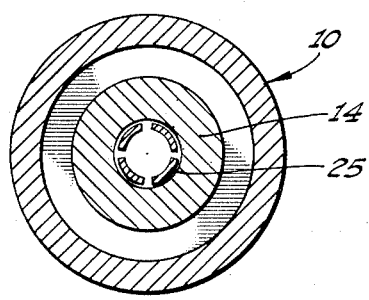

A somewhat simplified modification of an injection valve is shown in Figs. 12, 13, and 14. Generally stated, this modification differs from the two preceding forms in that it eliminates the use of an hydraulic coupling between the valve actuating member and the stem. This simplified form may or may not employ the pressure regulating surge or compensating cylinder and piston 75 of the modification shown in Figs. 7–11.

Figure 11:
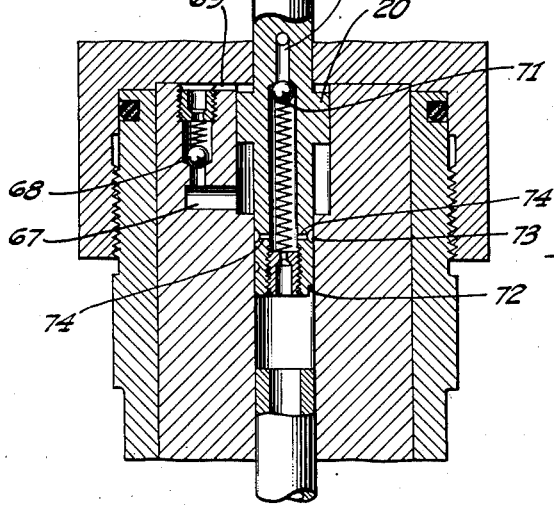
Fig. 11 is a longitudinal lateral section taken along the plane XI—XI of Fig. 7.

This simplified modification again includes a housing, a supply conduit provided with a check valve therein at 17, a leakage outlet 18, a vertically reciprocating axial stem 6 provided with a piston 20 operating in an upper chamber 11, a supply conduit 21 leading from the inlet port 17 to the lower chamber 11, and a bypass similar to that shown in Fig. 11 whereby liquid fuel from beneath the piston 20 may be pumped to the space above the piston 20. The lower chamber 12 of the device includes an injection head 14 and a valve member 25. As previously described, the lower chamber 12 may also be in communication with the bottom of the pressure regulator or surge piston 75.

It will be noted, however, that the compression spring 42 bears against the furcated upper end of the valve element 25 and against a shoulder of a stationary portion of the housing 10. Moreover, it will be noted that the stem 6 carries, at its lower end and as an integral part thereof, a valve actuating portion 27 capable of imparting radial movement to the furcated upper end of the valve element 25. The stem 6 is provided with an axial channel 70 in communication with the space immediately above the piston 20, the channel 70 discharging directly into chamber 12 through check valve 71. Stem 6 is preferably slightly larger in diameter above piston 20 than the diameter of stem portion 27 below the piston.

It will be evident that during the normal down stroke, liquid fuel is pumped from beneath the piston 20 to above the piston 20 through a bypass such as is shown in Fig. 11. Simultaneously the lower wedge-shaped portion of the stem 6 imparts outward radial movement to the upper flanged portion of valve element 25, such radial movement being translated into an upward movement of the head 36 of the valve element, thereby opening the ports 15 and permitting the oil contained in the lower chamber 12 and in the pressure regulating chamber beneath the piston 75 to be injected into the combustion chamber.

The simplified form of device shown in Figs. 12 to 14 need not include means for varying the length of the injection period, this type of injector valve being useful in constant speed units. A simple means for regulatably adjusting the range of axial movement of stem 6 and varying the length of period of injection is shown in Fig. 12, however, and includes an eccentric 100 carried by pivot pin 101, rocker arm 7 being journaled upon the eccentric. The position of the pivot point of the rocker arm can be readily varied by partially rotating pin 101 and eccentric 100, as by means of the handle or lever 102 attached to the pin 101. (Also see Fig. 10.)

Fig. 14 clearly shows the furcated upper portions of the valve element 25. Although in the drawings the upper furcated portions of the valve element are shown integral with the lower head or base 36, the valve element may be provided with an upper furcated portion in which the furcations are pivotally connected to the base 36.

Moreover, instead of empoying a conical wedge 28 for the purpose of imparting outward radial movement to the furcated end of the valve element, means of the character described in my copending application Serial No. 628,326, now Patent No. 2,507,664, may be employed to impart an inward radial movement to the valve element. Many changes may be made in the inclination of the surfaces, such as the surfaces 40, for the purpose of regulating the extent of movement of the head of the valve element.

Figure 15:
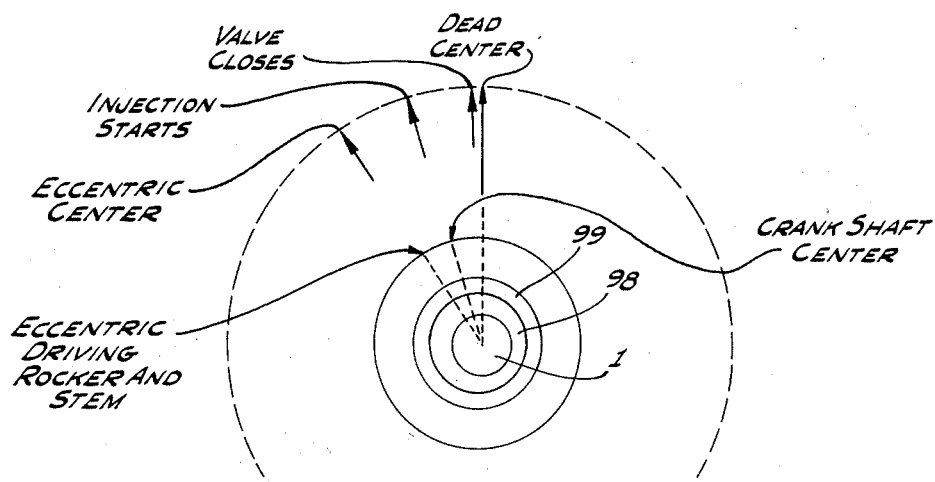
Fig. 15 is a diagram illustrating an eccentric drive for the rocker of the injection valve.

As previously stated, the rocker arm 7 is preferably directly driven from the crank shaft or cam shaft of the engine and it has been found desirable to impart positive mechanical motion to the rod 8 and rocker arm 7 in both directions. This may be easily accomplished by mounting an eccentric upon the crank shaft 1. Fig. 15 schematically illustrates an eccentric 98 mounted upon the crank shaft 1, the eccentric being rotatably mounted within an eccentric sleeve 99 which in turn is attached to the lower end of the connecting rod 8.

In most instances it is desirable to have the eccentric 98 retarded from about 10° to 20° with respect to the dead center of the crank shaft so that the stem 6 and the valve actuating assembly or wedge has a considerable longitudinal or axial movement imparted thereto at the time that the valve is opening. In this manner, injection may be caused to start 18° or 20° before dead center of the crank shaft and stopped either at dead center or shortly before the piston reaches dead center or carry-over past dead center, whichever is desirable.

It may be noted in passing that the rellief valves used in the exit lines 18 may be set at 1000 to 5000 pounds per square inch pressure and that the injection valve of the present invention may be caused to place the liquid fuel being injected at pressures ranging from 3000 to 7000 p. s. i.

It also has been found that the injection valve of the present invention has the property of causing extremely fine atomization of the fuel during the initial portions of the injection period, the size of the globules increasing somewhat in a desirable manner so that relatively large droplets of fuel are being injected when the valve is fully opened and just before closure of the valve element starts taking place.

The drawings submitted with the description given hereinabove do not include mechanical expedients directed toward ease of manufacture of the device except in a general manner since details of construction may be materially varied by those skilled in the art without departing from the essence of the invention. All changes and modifications coming within the scope of the appended claims are embraced thereby.

I claim:

1. An injection valve assembly including: a housing and a ported head; an axially movable stem mounted in the housing; a valve element in axial alignment with the stem in the housing, said valve element being normally seated on ports in said head; a valve actuating member in alignment with the stem and valve element; means actuated by axial movement of the stem to move the valve actuating member axially; means for translating axial movement of the valve actuating member into a port-opening axial movement of the valve element; and means, controlled by partial rotation of the stem, for regulating the period during which the valve element is in open-port position when said stem is reciprocated at a timed rate.

2. An injection valve assembly including: a housing and a ported head; an axially movable stem mounted in the housing; means for supplying liquid fuel to the housing; means, actuated by axial movement of the stem, for imparting pressure to the fuel supplied to the housing; a valve element in axial alignment with the stem in the housing, said valve element in normal position, closing the port in said head; a valve actuating member in alignment with the stem and valve element; and means actuated by axial movement of the stem to translate axial movement of the valve actuating member into a port-opening axial movement of the valve element.

3. In the injection valve assembly described in claim 2, the provision of a valve element including a base portion normally seated on said port, and a flanged end portion movable radially in a plane transverse to the axis of the valve element and stem.

4. An injection valve assembly of the character stated in claim 2 wherein the valve actuating member is fluid-coupled to the stem.

5. In an injection valve mechanism of the character stated in claim 2, the provision of means for regulatably adjusting the range of axial movement of the stem.

6. An injection valve assembly including a housing and a ported head; an axially movable stem mounted in the housing; a valve element in axial alignment with the stem, said valve element including a base portion normally seated on ports in said head, and a radially movable end portion; means actuated by axial movement of the stem for imparting radial movement to the end portion of the valve element; and means for translating radial movement of the end portion of the valve element into a port-opening axial movement of the valve element.

7. In an injection valve assembly of the character stated in claim 6, the provision of means for varying the amount of radial movement imparted to the end portion of the valve element.

8. In an apparatus of the character stated in claim 6, the provision of means for regulatably adjusting the stem-actuated means by axial movement of the stem.

9. In an injection valve assembly: a housing provided with a ported head; an axially movable stem mounted in the housing; a piston carried by the stem; means for admitting liquid to a supply side of said piston; conduit means, including a check valve, for passing liquid from the supply side of the piston to a discharge side thereof; a chamber in the housing adjacent the ported head; conduit means connecting the discharge side of the piston with the chamber; a valve element in the chamber and in axial alignment with the stem, said valve element including a base portion normally seated on ports in said head and a radially movable end portion; means actuated by axial movement of the stem for imparting radial movement to the end portion of the valve element; and means for translating the radial movement of such end portion into an axial port-opening movement of the valve element.

10. In an injection valve assembly including a housing and a ported head, the combination of: an axially movable stem in the housing; a valve element in axial alignment with the stem, said valve element being provided with a base portion and a flanged furcated end portion movable radially in a plane transverse to the axis of the stem and valve element; means for reciprocating the stem; means for supplying liquid to the assembly; means actuated by axial movement of the stem for imparting pressure to the liquid; and means for translating axial motion of the stem into an axial port-opening movement of the valve element.

11. An apparatus of the character stated in claim 10 wherein the means for translating axial motion of the stem into axial movement of the valve element comprise a wedge carried by the stem, inclined faces in the end portion of the valve element, and inclined supporting surfaces for the flanged end portion of said element.

12. In an injection valve assembly including a housing and a ported head, the combination of: an axially movable stem in the housing; a valve element in axial alignment with the stem, said valve element being provided with a base portion and a flanged furcated end portion movable radially in a plane transverse to the axis of the stem and valve element; means for reciprocating the stem; means for supplying liquid to the assembly; means actuated by axial movement of the stem for imparting pressure to the liquid; means for translating axial motion of the stem into an axial port-opening movement of the valve element; and means for regulatably adjusting the range of axial movement of the stem.

13. A stem-actuated liquid injection valve mechanism comprising: a housing provided with an upper chamber, an intermediate liquid coupling chamber, and a lower chamber; said housing having ports in communication with the lower chamber; a substantially cylindrical axially movable valve element provided with a base normally seated on said ports; a bore connecting said chambers and in alignment with the valve element, a stem in said bore and upper chamber, said stem extending exteriorly of the housing; a supply of liquid in communication with the upper chamber; means actuated by movement of the stem for placing the liquid under pressure and supplying the same to the coupling chamber and lower chamber; a valve actuating mechanism extending into the bore between the coupling chamber and lower chamber, said actuating mechanism being coupled to the stem by liquid in the coupling chamber; and means for translating axial movement of the valve actuating mechanism into a port-opening axial movement of the valve element, said stem being arranged to seal said lower chamber before said valve-actuating mechanism imparts port-opening movement to the valve element.

14. In an injection valve mechanism of the character stated in claim 13, the inclusion of means for releasing liquid pressure from the coupling chamber to release the valve actuating mechanism and allow its return to normal position.

15. In a liquid injection valve of the character stated in claim 13, the provision of means for storing liquid at high pressure and in communication with the lower chamber.

16. In a liquid injection valve of the character stated in claim 13, the provision of means for controlling the timing of the valve element by regulatably adjusting the range of axial movement of the stem.

17. In an injection valve assembly: a housing provided with a ported head and a cylinder bore; an axially movable stem mounted in the housing and extending through said cylinder bore; a piston carried by the stem in such cylinder bore; means for admitting liquid to the supply side of the piston cylinder; conduit means including a check valve for passing liquid from the supply side of the piston to a discharge side of the piston cylinder; a chamber in the housing adjacent the ported head; conduit means connecting the discharge side of the piston cylinder with the chamber; a valve element in the chamber and in axial alignment with the stem, said valve element including a base portion normally closing the port in said head, and a radially movable end portion; means actuated by axial movement of the stem for imparting radial movement to the end portion of the valve element; and means for translating the radial movement of such end portion into an axial port-opening movement of the valve element.

18. An injection valve assembly of the character stated in claim 17 wherein the supply side of the piston cylinder is of larger volume than the discharge side of the piston cylinder.

19. An injection valve assembly of the character stated in claim 17 including means for reciprocating the stem, and means for regulatably adjusting the range of axial movement of the stem.

20. An injection valve assembly of the character stated in claim 17 wherein the means actuated by axial movement of the stem for imparting radial movement to the end portion of the valve element comprise a valve actuating mechanism fluid-coupled to the stem.

21. An injection valve assembly of the character stated in claim 17 wherein the means actuated by axial movement of the stem for imparting radial movement to the end portion of the valve element comprise a valve actuating mechanism fluid-coupled to the stem; and means for releasing pressure from the fluid coupling to release the valve actuating means at a predetermined point in its travel.

22. An injection valve assembly including: a housing and a ported head; an axially movable stem mounted in the housing; a valve element in axial alignment with the stem in the housing, said valve element including a base portion normally closing the port in said head and a radially movable end portion; a valve-actuating member in alignment with the stem and valve element and connected with the stem to be axially moved thereby; and means responsive to axial movement of the valve actuating member to impart radial movement to the end portion of the valve element; and means for translating radial movement of the end portion of the valve element into a port-opening axial movement of the valve element.

23. An injection valve assembly of the character stated in claim 22 wherein the valve actuating member is fluid-coupled to the stem.

24. An injection valve assembly including: a housing and a ported head, the housing being provided with means for connection to an engine to place the port head in operative relation to a combustion chamber of such engine; an axially movable stem mounted in the housing; a fuel supply connected to the housing; means actuated by the stem for drawing fuel into the housing, imparting pressure to the fuel drawn into the housing, and isolating a charge of fuel at high pressure; a valve element in axial alignment with the stem within the housing, said valve element normally closing the port in said head; a valve-actuating member in alignment with the stem and valve element; and means actuated by axial movement of the stem to impart axial movement to the valve-actuating member and translate such movement into a port-opening axial movement of the valve element.

25. An injection valve assembly including: a housing and a ported head; an axially movable stem mounted in the housing; a fuel supply connected to the housing; means actuated by the stem for drawing fuel into the housing, imparting pressure to the fuel drawn into the housing, and isolating a charge of fuel at high pressure; a valve element in axial alignment with the stem in the housing, said valve element in normal position closing the port in said head; a valve-actuating member in alignment with the stem and valve element; and means actuated by axial movement of the stem to translate axial movement of the valve-actuating member into a port-opening axial movement of the valve element.

26. An injection valve of the character stated in claim 25, including a chamber adjacent said valve element in which fuel at high pressure is isolated.

HAROLD M. DUDEK.

REFERENCES CITED

The following references are of record in the file of this patent:

UNITED STATES PATENTS

| Number    | Name    | Date          |
|-----------|---------|---------------|
| 1,845,600 | Herr    | Feb. 16, 1932 |
| 1,981,913 | Fielden | Nov. 27, 1934 |
| 1,982,023 | Ritz    | Nov. 27, 1934 |
| 2,068,678 | Hoadley | Jan. 26, 1937 |
| 2,096,711 | Fielden | Oct. 26, 1937 |
| 2,135,925 | Tuscher | Nov. 8, 1938  |
| 2,299,452 | Bell    | Oct. 20, 1942 |
| 2,313,264 | Reggio  | Mar. 9, 1943  |
| 2,395,810 | Green   | Mar. 5, 1946  |
| 2,507,664 | Dudek   | May 16, 1950  |

FOREIGN PATENTS

| Number  | Country       | Date          |
|---------|---------------|---------------|
| 419,920 | Great Britain | Nov. 21, 1934 |
| 632,909 | France        | Oct. 17, 1927 |